United States Patent
Yamamoto et al.

(10) Patent No.: US 11,046,373 B2
(45) Date of Patent: Jun. 29, 2021

(54) MOBILE DEVICE AND MOBILE DEVICE MANAGEMENT SYSTEM

(71) Applicant: Hitachi, Ltd., Tokyo (JP)

(72) Inventors: Akihiro Yamamoto, Tokyo (JP); Ryosuke Nakamura, Tokyo (JP); Ryoko Ichinose, Tokyo (JP)

(73) Assignee: Hitachi, Ltd., Tokyo (JP)

(*) Notice: Subject to any disclaimer, the term of this patent is extended or adjusted under 35 U.S.C. 154(b) by 239 days.

(21) Appl. No.: 16/339,597

(22) PCT Filed: Sep. 14, 2017

(86) PCT No.: PCT/JP2017/033245
§ 371 (c)(1),
(2) Date: Apr. 4, 2019

(87) PCT Pub. No.: WO2018/074117
PCT Pub. Date: Apr. 26, 2018

(65) Prior Publication Data
US 2019/0233027 A1  Aug. 1, 2019

(30) Foreign Application Priority Data
Oct. 18, 2016  (JP) .............................. JP2016-204231

(51) Int. Cl.
*B62D 37/04* (2006.01)
*B62D 1/12* (2006.01)
(Continued)

(52) U.S. Cl.
CPC .............. *B62D 37/04* (2013.01); *B60W 30/02* (2013.01); *B62D 61/12* (2013.01); *G01C 21/34* (2013.01); *G05D 1/02* (2013.01); *B60W 2556/45* (2020.02)

(58) Field of Classification Search
USPC ....................................................... 701/124
See application file for complete search history.

(56) References Cited

U.S. PATENT DOCUMENTS

| 5,975,225 A * | 11/1999 | Kamen | ................ B62K 11/007 |
| | | | 180/7.1 |
| 2001/0001992 A1* | 5/2001 | Morrell | ................ G05B 13/042 |
| | | | 180/8.1 |

(Continued)

FOREIGN PATENT DOCUMENTS

| JP | 2000-202792 A | 7/2000 |
| JP | 2001-63645 A | 3/2001 |

(Continued)

OTHER PUBLICATIONS

International Search Report (PCT/ISA/210) issued in PCT Application No. PCT/JP2017/033245 dated Oct. 10, 2017 with English translation (five (5) pages).

(Continued)

*Primary Examiner* — Tyler D Paige
(74) *Attorney, Agent, or Firm* — Crowell & Moring LLP

(57) ABSTRACT

Providing a movement control means for detecting a collision between a driving wheel and a step and a catch of a driven wheel by the step and temporarily changing a gravity center control region of a mobile device and moving the mobile device to pass over the step, and a mobile device including the same in order to prevent immovability under an environment having a step or an irregularity. Thus, a mobile device is configured to include: a lower body; an upper body provided in an upper portion of the lower body; a gravity center position adjustment means for changing an angle or a position of the upper body with respect to the lower body; and a driving wheel and a driven wheel provided in a lower portion of the lower body, and during movement in a direction in which the driving wheel is on a front side and the driven wheel is on a rear side, the gravity center position adjustment means inclines or moves the upper body to the front side when the driven wheel passes (Continued)

over the step, and moves the upper body toward an original angle or position after the driven wheel passes over the step.

9 Claims, 11 Drawing Sheets

(51) Int. Cl.
    *G05D 1/02*           (2020.01)
    *G01C 21/34*         (2006.01)
    *B60W 30/02*        (2012.01)
    *B62D 61/12*         (2006.01)

(56) References Cited

U.S. PATENT DOCUMENTS

| | | | | |
|---|---|---|---|---|
| 2007/0194540 | A1* | 8/2007 | Caspi | B62B 5/02 |
| | | | | 280/5.22 |
| 2008/0185795 | A1* | 8/2008 | Cheng | A61G 5/063 |
| | | | | 280/5.28 |
| 2011/0137462 | A1 | 6/2011 | Nakamura et al. | |
| 2012/0095619 | A1* | 4/2012 | Pack | G05D 1/0038 |
| | | | | 701/2 |
| 2014/0116792 | A1* | 5/2014 | Ueda | A61G 5/061 |
| | | | | 180/8.3 |
| 2015/0105940 | A1* | 4/2015 | Takase | B62D 57/024 |
| | | | | 701/1 |
| 2019/0118881 | A1* | 4/2019 | Mcginn | B62D 57/028 |

FOREIGN PATENT DOCUMENTS

| | | |
|---|---|---|
| JP | 2006-190105 A | 7/2006 |
| JP | 2008-134744 A | 6/2008 |
| JP | 2009-286395 A | 12/2009 |
| JP | 2010-146202 A | 7/2010 |
| JP | 2011-120383 A | 6/2011 |
| JP | 2012-224250 A | 11/2012 |
| JP | 2014-48842 A | 3/2014 |
| WO | WO 2014/002275 A1 | 1/2014 |

OTHER PUBLICATIONS

Japanese-language Written Opinion (PCT/ISA/237) issued in PCT Application No. PCT/JP2017/033245 dated Oct. 10, 2017 (four (4) pages).

Japanese-language Office Action issued in Japanese Application No. 2018-546193 dated Mar. 3, 2020 with English translation (six (6) pages).

* cited by examiner

FIG. 1
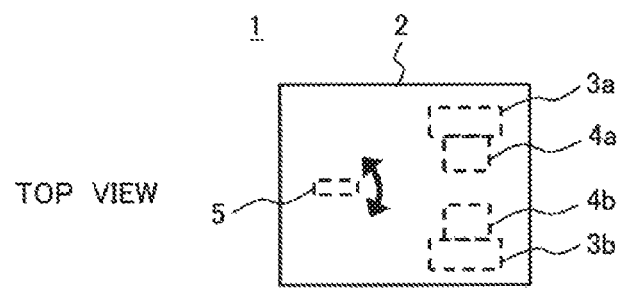
TOP VIEW
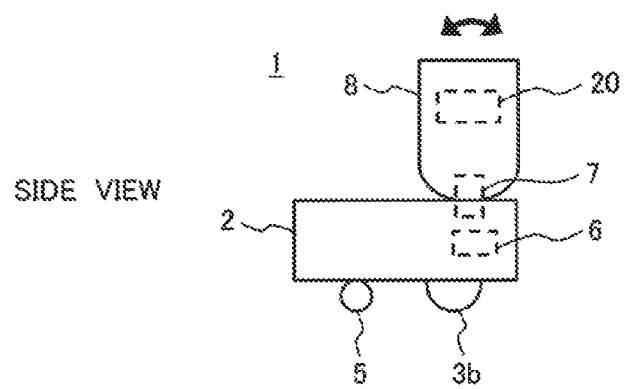
SIDE VIEW
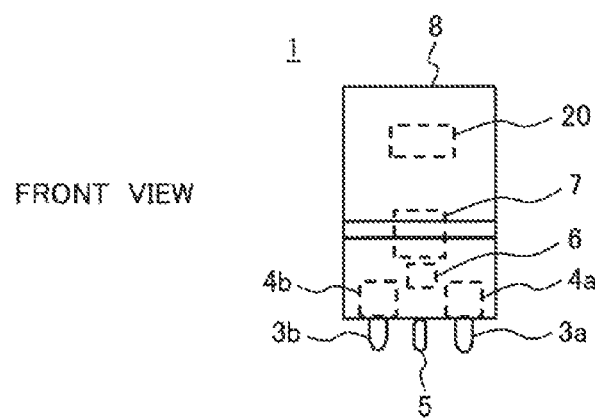
FRONT VIEW

FIG. 2
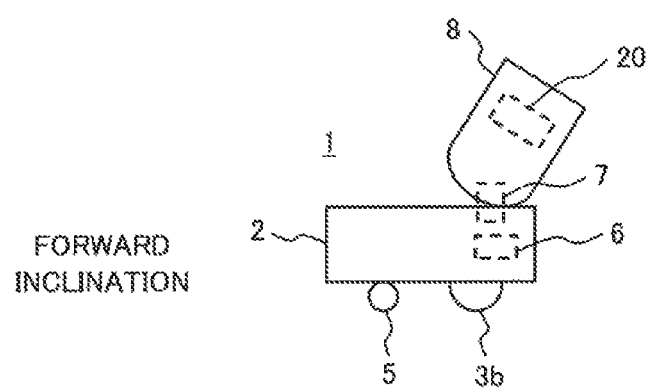
FORWARD INCLINATION
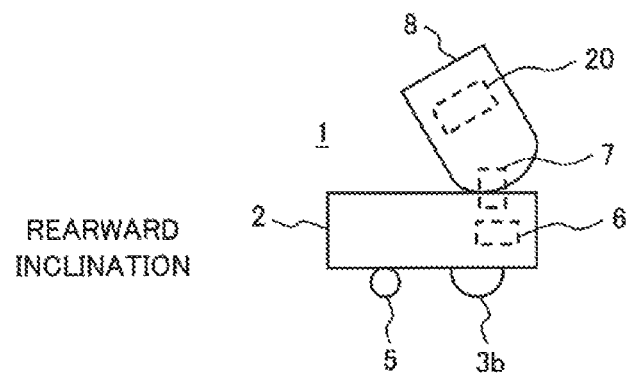
REARWARD INCLINATION

FIG. 7
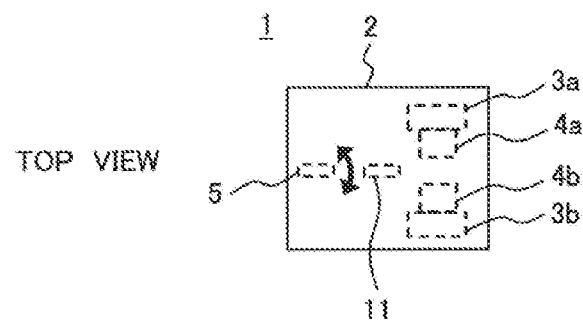
TOP VIEW
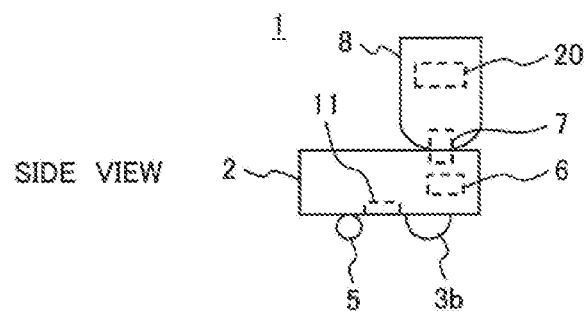
SIDE VIEW
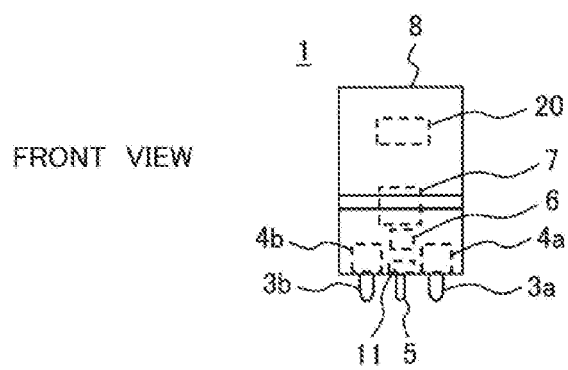
FRONT VIEW

FIG. 8
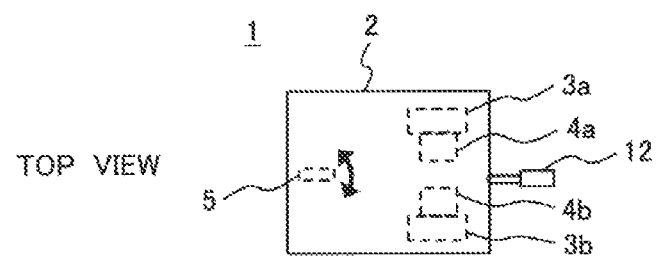
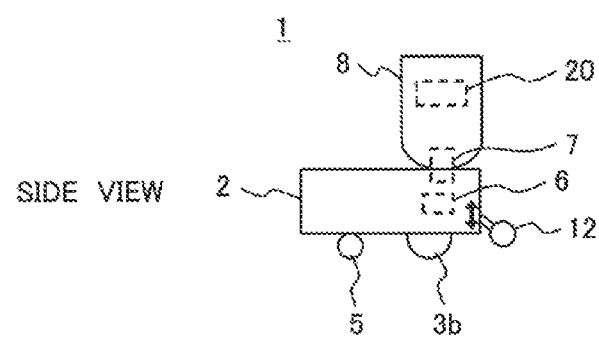
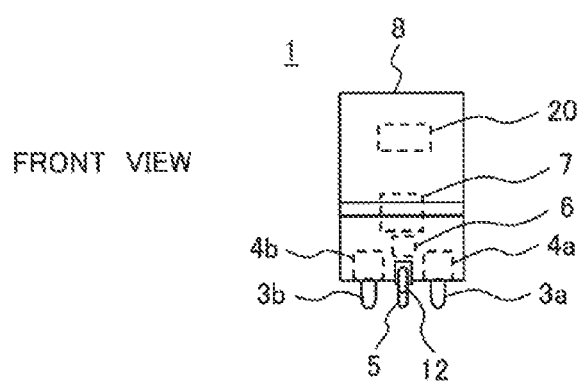

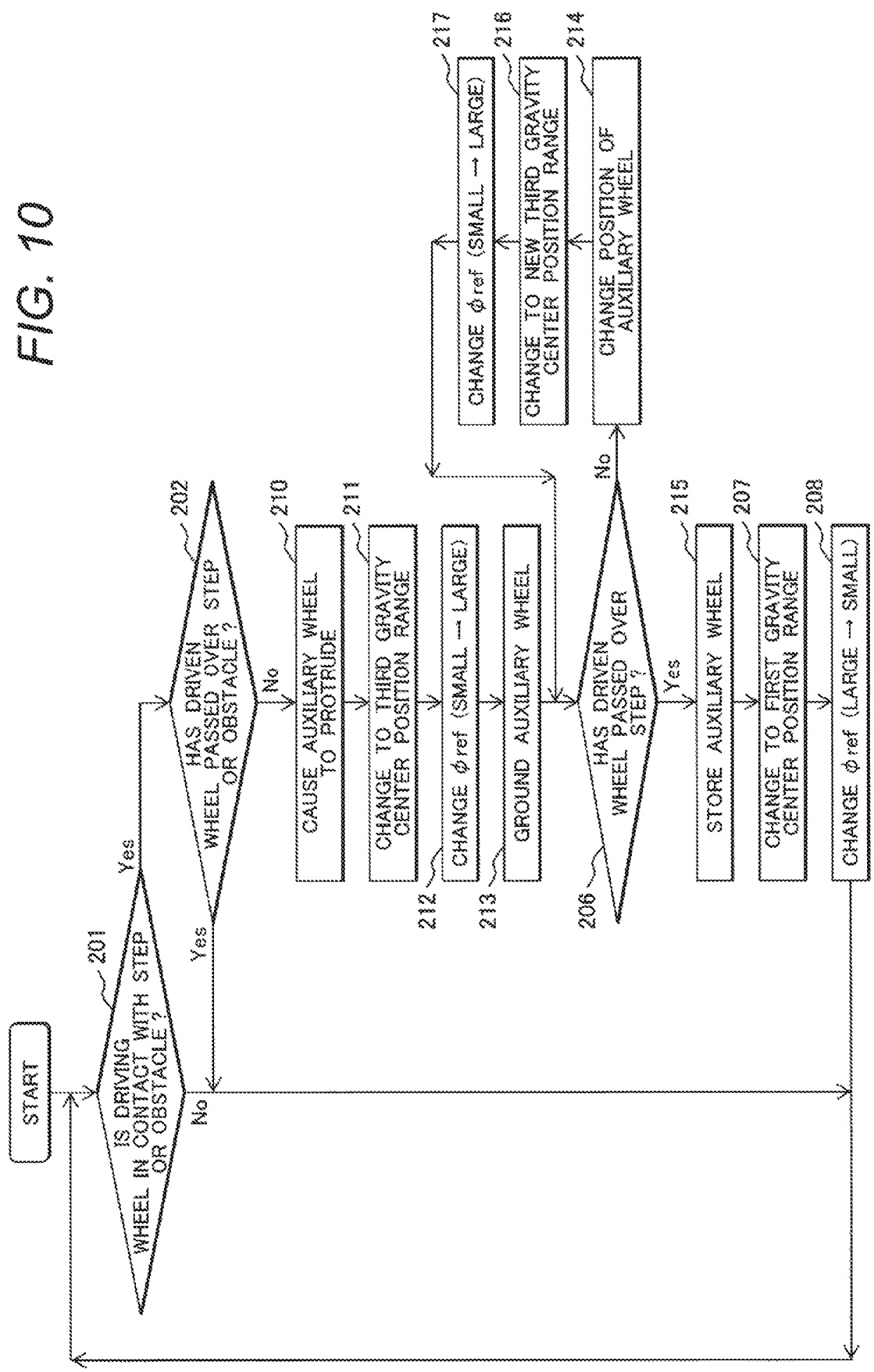

FIG. 11
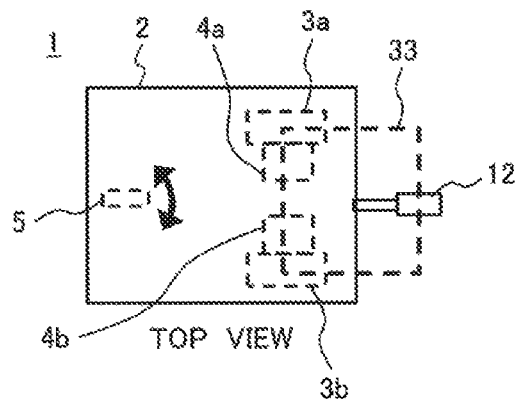
FIG. 12
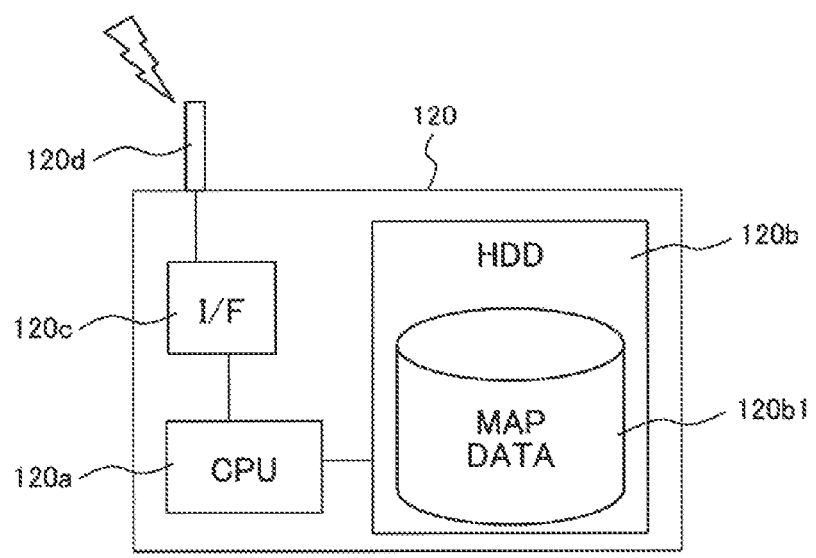
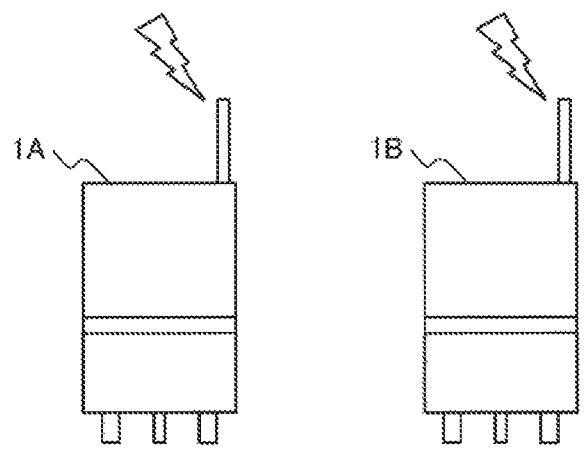

MOBILE DEVICE AND MOBILE DEVICE MANAGEMENT SYSTEM

TECHNICAL FIELD

The present invention relates to a mobile device having a driving wheel and a driven wheel, and a mobile device control system that controls the mobile device.

BACKGROUND ART

Mobile devices with driving wheels and driven wheels have been well known. For example, a configuration in which driving wheels are arranged on the left and right and the driven wheels are arranged on the front side, the rear side, or both the front side and rear side of rotary shafts of the left and right driving wheels is simple, and can secure stability during movement. Such a mobile device can move straight by making rotational speeds of the left and right driving wheels coincide with each other, and can make a turn by making rotational speeds of the left and right driving wheels different from each other. The driven wheel is installed with such a degree of rotational freedom as to be capable of passively following the traveling direction determined by the driving wheel.

Such a mobile device is required to be capable of moving freely even under an environment having a step or an irregularity, and various kinds of means for overcoming the steps and obstacles have been proposed.

For example, in a mobile device described in PTL 1, an air cylinder is controlled in accordance with each state of the mobile device and a step to swing up or swing down a steering wheel in combination with movement of the center of gravity in the front-rear direction using an upper body mobile device, thereby passing over the step as illustrated in FIGS. 8 and 9 and the like of the same document.

Further, a mobile device described in PTL 2 shifts the center of gravity in a left-right direction with respect to a traveling direction in accordance with an entrance angle, a step height, and an entering speed when driving wheels pass over a step so as to realize prevention of route deviation in a travel direction caused by a rollover or lateral vibration caused by a collision at the time of passing over the step as described in the Abstract and the like of the same document and the like.

Further, a mobile device described in PTL 3 changes a height of a driven wheel relatively by a vertical movement mechanism installed on a driving wheel and moves up and down a step (stairway) while moving the center of gravity by a human hand as illustrated in FIG. 8 and the like of the same document.

CITATION LIST

Patent Literature

PTL 1: JP 2001-63645 A
PTL 2: JP 2011-120383 A
PTL 3: JP 2012-224250 A

SUMMARY OF INVENTION

Technical Problem

However, the technique described in PTL 1 passes over the step using a movement mechanism (air cylinder) capable of operating the steering wheel in the vertical direction and requires the movement mechanism (air cylinder) for all the steering wheels used in the mobile device, and thus, has a complicated structure.

Further, the technique described in PTL 2 is a technique for realizing stabilization of traveling of the mobile device when the driving wheel passes over the step, and there is no description on a technique for realizing stabilization of traveling when the driven wheel passes over a step.

The technique described in PTL 3 relatively changes the height of the driven wheel using a movement mechanism capable of operating the driving wheel in the vertical direction and passes over the step while borrowing the human hand, and is hardly applied to automatic traveling or autonomous traveling.

An object of the present invention is to provide a mobile device capable of preventing a driven wheel of the mobile device from becoming immovable in an environment having a step or an irregularity with a simple configuration.

Solution to Problem

In order to achieve the above object, a mobile device of the present invention includes: a lower body; an upper body provided in an upper portion of the lower body; a gravity center position adjustment means for changing an angle or a position of the upper body with respect to the lower body; and a driving wheel and a driven wheel provided in a lower portion of the lower body. During movement in a direction in which the driving wheel is on a front side and the driven wheel is on a rear side, the gravity center position adjustment means controls the angle or the position of the upper body within a range in which a center of gravity falls within a first gravity center position range which enables stable traveling before and after the driven wheel passes over a step, and controls the angle or the position of the upper body within a range in which the center of gravity falls within a second gravity center position range that expands to the front side from the first gravity center position range when the driven wheel passes over the step.

Further, it is configured to provide: a lower body; an upper body provided in an upper portion of the lower body; a gravity center position adjustment means for changing an angle or a position of the upper body with respect to the lower body; and a driving wheel and a driven wheel provided in a lower portion of the lower body, and during movement in a direction in which the driving wheel is on a front side and the driven wheel is on a rear side, the gravity center position adjustment means inclines or moves the upper body to the front side when the driven wheel passes over the step, and moves the upper body toward an original angle or position after the driven wheel passes over the step.

Further, a transport device management system of the present invention includes: a management device having map data in which a step position is recorded; and a mobile device moving based on the map data received from the management device. The mobile device includes: a lower body; an upper body provided in an upper portion of the lower body; a gravity center position adjustment means for changing an angle or a position of the upper body with respect to the lower body; a driving wheel and a driven wheel provided in a lower portion of the lower body; and an antenna used for communication with the management device, and during movement in a direction in which the driving wheel is on a front side and the driven wheel is on a rear side, the gravity center position adjustment means inclines or moves the upper body to the front side when the driven wheel passes over the step, and moves the upper body toward an original angle or position after the driven wheel passes over the step.

Advantageous Effects of Invention

According to the present invention, it is possible to avoid a situation in which the driven wheel is caught by the step or irregularity to be immovable after the driving wheel of the mobile device mobile device mobile device mobile device passes over the step or irregularity. Therefore, it is possible to provide a movement control method capable of moving even in the environment where the step or an obstacle is present. Further, it is possible to provide the mobile device provided with such a movement control method.

BRIEF DESCRIPTION OF DRAWINGS

FIG. 1 is an exterior view of a mobile device 1 according to a first embodiment.

FIG. 2 is an exterior view of an upper body 8 with respect to a lower body 2 using a gravity center position adjustment mechanism 7.

FIG. 7 is all exterior view of the mobile device 1 according to a second embodiment.

FIG. 8 is an exterior view of the mobile device 1 according to a third embodiment.

FIG.

FIG. 10 is a flowchart of movement control according to the third embodiment.

FIG. 11 is a gravity center position control region according to the third embodiment.

FIG. 12 is a mobile device management system according to a fourth embodiment.

DESCRIPTION OF EMBODIMENTS

Figure 3:
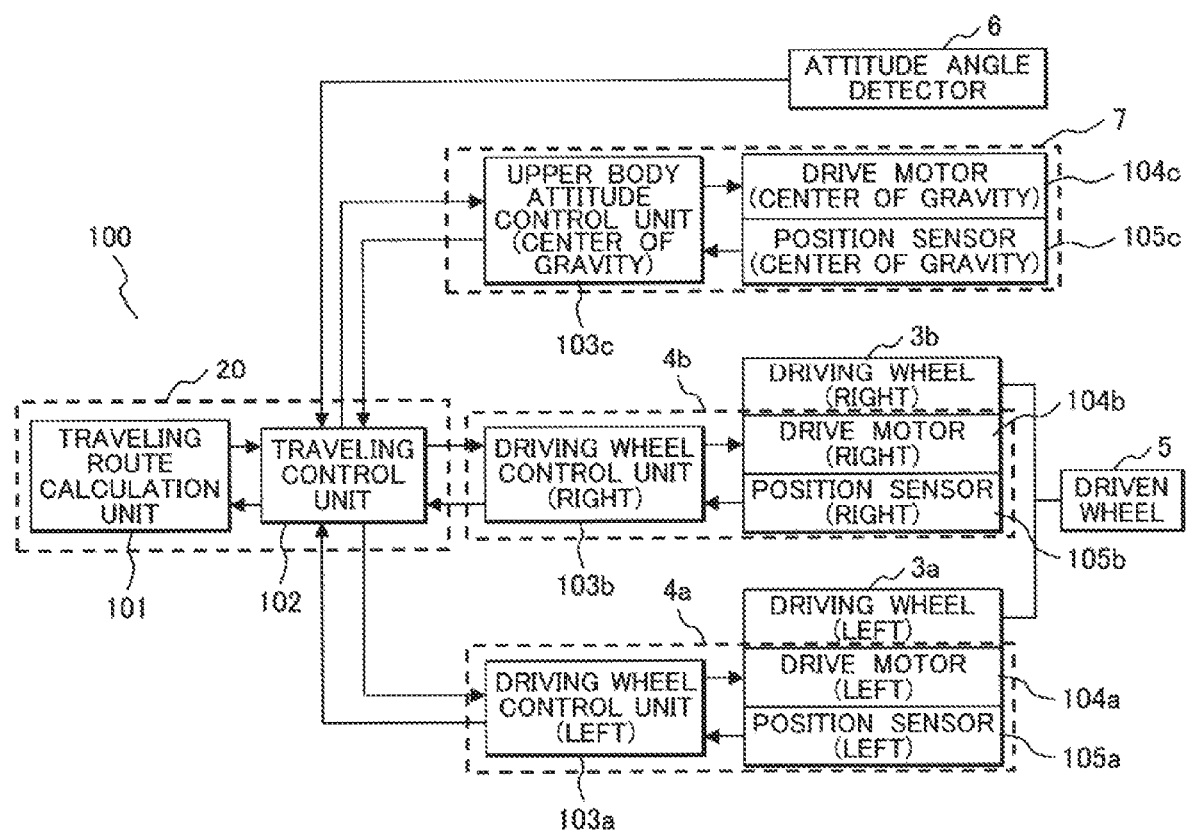
FIG. 3 is a schematic diagram of a traveling control system 100.

Hereinafter, embodiments of the present invention will be described with reference to the drawings.

First Embodiment

A mobile device 1 according to a first embodiment will be described with reference to FIGS. 1 to 6. First, the exterior of the mobile device 1 is illustrated in FIG. 1. The mobile device 1 is configured such that an upper body 8 and a lower body 2 are connected by a gravity center position adjustment mechanism 7 so as to enable the upper body 8 to be inclined back and forth as illustrated in the side view.

Further, driving wheels 3a and 3b are arranged on the left and right sides of the lower body 2, and wheel drive mechanisms 4a and 4b are installed in the driving wheels 3a and 3b, respectively, as illustrated in the front view. The wheel drive mechanisms 4a and 4b are provided with motors, and drive the driving wheels 3a and 3b by rotating the motors in a state where rotary shafts of the motor and rotary shafts of the driving wheels 3a and 3b are connected, thereby moving the mobile device 1. A driven wheel 5 is installed on the rear side of the driving wheels 3a and 3b, and passively rotates as the mobile device 1 moves as illustrated in the top view or the side view. The driven wheel 5 is held on the lower body 2 so as to be capable of rotating not only in the same rotational direction as the driving wheels 3a and 3b but also in a direction of the arrow illustrated in the top view. That is, the driven wheel 5 is rotatable so as to passively follow a traveling direction determined by the driving wheels 3a and 3b. Further, an attitude angle detector 6 capable of detecting an attitude angle and angular velocity is installed on the lower body 2.

The upper body 8 is connected to the lower body 2 via the gravity center position adjustment mechanism 7 as illustrated in the side view and the top view. The gravity center position adjustment mechanism 7 is provided with a motor, and can incline the upper body 8 in the arrow direction (pitch direction) with respect to the lower body 2 by rotating the motor (for example, as illustrated in FIG. 2, an attitude inclined forward or backward can be taken).

Further, the upper body 8 is provided with an electronic arithmetic processor 20 that calculates a traveling route based on a detection result of an environmental camera, a sensor or the like (not illustrated) and calculates a movement command to the mobile device 1, a position of the mobile device 1, and the like.

FIG. 3 illustrates an outline of the traveling control system 100 of the mobile device 1 centered on the electronic arithmetic processor 20. This system is mainly constituted by the electronic arithmetic processor 20, the driving wheels 3a and 3b, the wheel drive mechanisms 4a and 4b, the driven wheel 5, the attitude angle detector 6, and the gravity center position adjustment mechanism 7.

The electronic arithmetic processor 20 is constituted by a traveling route calculation unit 101 and a traveling control unit 102. The wheel drive mechanisms 4a and 4b are constituted by driving wheel control units 103a and 103b, drive motors 104a and 104b, and position sensors 105a and 105b, respectively.

In the traveling route calculation unit 101, the traveling route is detected based on a position where the mobile device 1 is located and the detection result of the environmental camera, the sensor, or the like, a traveling speed command vref and a traveling direction command $\psi$ref are calculated and output to the traveling control unit 102. In the traveling control unit 102, a current command I0_ref to be output to the driving wheel control units 103a and 103b is calculated based on the traveling speed command vref and an actual traveling speed v calculated using detection results of the position sensors 105a and 105b. Further, a deviation command Id_ref of the current command to be output to the left and right driving wheel control units 103a and 103b is calculated based on the traveling direction command $\psi$ref and an actual traveling direction $\psi$ calculated using the detection results of the position sensors 105a and 105b. The mobile device 1 has the driving wheels 3a and 3b on the left and right, and thus, can make a turn toward the driving wheel having a small rotation angle by making a difference in rotational speed and rotation angle between the left and right driving wheels 3a and 3b. That is, in the case of turning left, a current command IL_ref (=I0_ref−Id_ref) is output to the driving wheel control unit 103a, and a current command IR_ref (=I0_ref+Id_ref) is output to the driving wheel control unit 103b. The driving wheel control units 103a and 103b apply voltages corresponding to the current commands IL_ref and IR_ref to the drive motors 104a and 104b, respectively, to rotate the motors, whereby the driving wheels 3a and 3b rotate.

The rotation angles of the drive motors 104a and 104b are detected by the position sensors 105a and 10b, and the actual traveling speed v and the actual traveling direction ψ of the mobile device 1 are calculated by the traveling control unit 102 via the driving wheel control units 103a and 103b. Further, the actual traveling speed v and the actual traveling direction ψ are output to the traveling route calculation unit 101 so that a position of the mobile device 1 is calculated.

The gravity center position adjustment mechanism 7 is constituted by an upper body attitude control unit 103c, a drive motor 104c, and a position sensor 105c. In the traveling control unit 102, a gravity center position of the mobile device 1 is calculated, and an inclination angle command φref of the upper body 8 with respect to the lower body 2 is calculated in accordance with acceleration or deceleration of the mobile device 1 or the like such that the gravity center position of the mobile device 1 always exists within a first gravity center position range 31 where the mobile device 1 can travel stably (for example, within a rectangular range surrounded by contact points of the two driving wheels 3a and 3b and the single driven wheel 5 with the ground). The calculated inclination angle command φref is output to the upper body attitude control unit 103c, and a necessary drive voltage is calculated based on the inclination angle command φref and an actual inclination angle φ and applied to the drive motor 104c. A rotation angle of the drive motor 104c is detected by the position sensor 105c and output to the traveling control unit 102 via the upper body attitude control unit 103c. The attitude angle detector 6 is installed in the lower body 2, and thus, detects only an attitude angle of the lower body 2 with respect to a traveling surface without detecting the inclination angle φ of the upper body 8 with respect to the lower body 2.

Figure 4A:
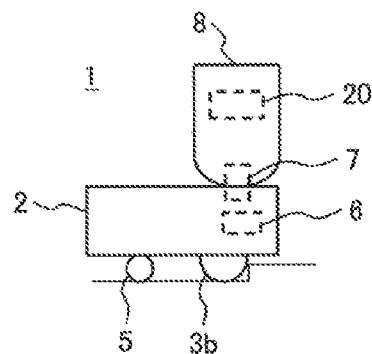
FIGS. 4A to 4D are each state views at the time of passing over a step according to the first embodiment.
Figure 4B:
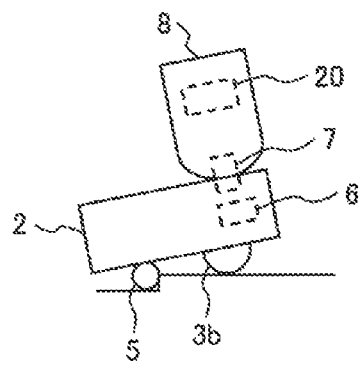
Figure 4C:
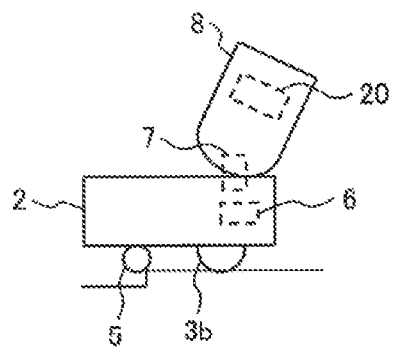
Figure 4D:
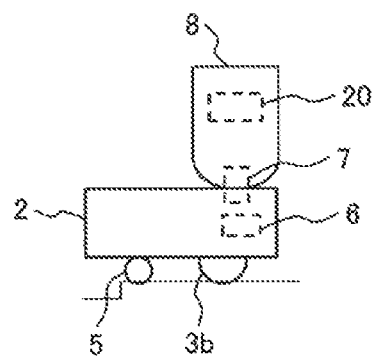
Figure 5:
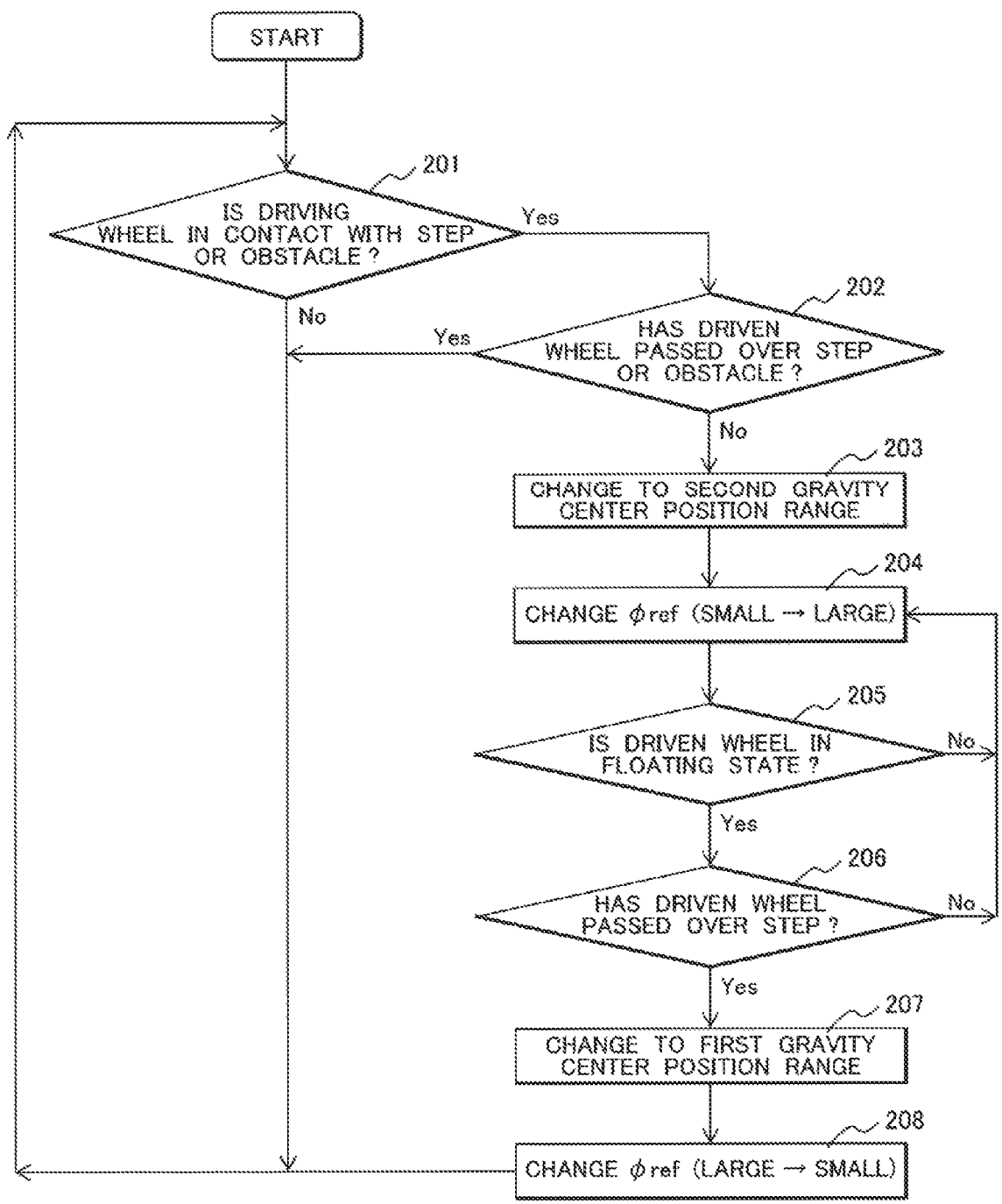
FIG. 5 is a flowchart of movement control according to the first embodiment.
Figure 6A:
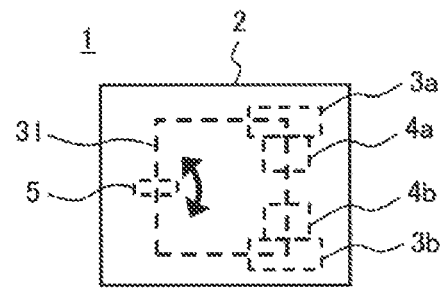
FIGS. 6A and 6B are gravity center position control regions according to the first embodiment.
Figure 6B:
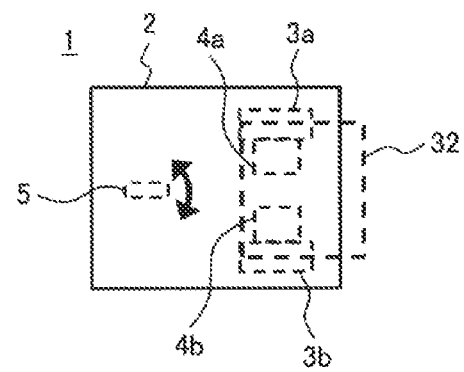

FIG. 4 illustrates each state when the mobile device 1 passes over a step or an obstacle, and FIG. 5 illustrates a control flow executed in the traveling control unit 102 when passing over a step.

As illustrated in FIG. 5, it is determined whether the mobile device 1 is in contact with a step or an obstacle in Flow 201.

As a method of detecting the contact with the step or obstacle, there is a method of performing determination based on whether a deviation speed which is a difference between the traveling speed command vref and the actual traveling speed v is generated. When the mobile device 1 comes into contact with the step or obstacle, an impact that hinders traveling is applied to the driving wheels 3a and 3b, and the actual traveling speed v instantaneously lags behind the traveling speed command vref. Thus, the step can be detected based on whether the deviation speed between the traveling speed command vref and the actual traveling speed v exceeds a predetermined threshold which is not generated during normal traveling, and it is possible to determine that the driving wheels 3a and 3b have come into contact with the step when the deviation speed exceeds the threshold.

Further, currents IL and IR flowing to the drive motors 104a and 104b may be used as another detection means. The currents IL and IR flowing to the drive motors 104a and 104b with respect to an acceleration command increase in order to cope with loads generated in the driving wheels 3a and 3b. It is determined that the driving wheels 3a and 3b have come into contact with the step when an increase amount of the current increases. Further, an angle θ in the pitch direction and an angular velocity dθ detected by the attitude angle detector 6 may be used as the other detection means. The mobile device 1 is in a decelerating state due to the loads generated in the driving wheels 3a and 3b, and the center of gravity moves toward the traveling direction due to inertia so that an attitude of the lower body 2 changes. The step can be detected based on whether the angle θ in the pitch direction or the angular velocity dθ of the lower body exceeds a predetermined threshold which is not generated during normal traveling. Incidentally, the above-described step detection means may be used separately or in combination.

The process transitions to Flow 202 when the mobile device 1 comes into contact with the step or the like and is in the state of FIG. 4(a), or repeats the determination in Flow 201 in preparation for contact with a step or the like when the mobile device 1 is not in contact with the step.

In Flow 202, it is determined whether the driven wheel 5 has passed over the step or obstacle. Since a distance L between each of the driving wheels 3a and 3b and the driven wheel 5 is known in advance, it is possible to predict a presumable time t1=L/v until the driven wheel 5 comes into contact with the step or obstacle based on the actual traveling speed v when the driving wheels 3a and 3b come into contact with the step. When the driven wheel 5 has passed over the step after the time t1, a deviation speed of the actual traveling speed v with respect to the traveling speed command vref is temporarily generated due to the contact between the driven wheel 5 and the step or obstacle, but the actual traveling speed is not zero. On the other hand, when the driven wheel 5 is caught by the step or obstacle without passing over the step or obstacle, the mobile device is in the state of being incapable of traveling, and thus, the actual traveling speed becomes zero even if the traveling speed command vref is higher than zero. That is, it is determined whether the traveling speed command vref>0 and the actual traveling speed v>0 are satisfied after the time t1. Incidentally, the presumable time may be determined within a time range, such as from t1−t_off to t1+t_off, in consideration of an error of the actual traveling speed v. Further, the actual traveling speed v may be determined as zero, for example, when being equal to or lower than 0.5 m/s.

If the above inequalities are satisfied, it can be determined that the driven wheel has passed over the step, and thus, the determination in Flow 201 is repeated in preparation for the next step. On the other hand, when the inequality is not satisfied, it can be determined that the driven wheel 5 is in the state illustrated in FIG. 4(b) in which the driven wheel 5 is caught by the step, and thus, the process transitions to Flow 203.

In Flow 203, the gravity center position adjustment range is changed from the first gravity center position range 31 to a second gravity center position range 32, and the process transitions to Flow 204. Although inclination angle φ of the upper body 8 with respect to the lower body 2 is sometimes adjusted in accordance with the acceleration or deceleration of the mobile device 1 even during normal traveling before Flow 203, the gravity center position adjustment mechanism 7 is controlled for safety travelling such that the gravity center position of the mobile device 1 always falls within the first gravity center position range 31 forming a boundary between the driving wheels 3a and 3b and the driven wheel 5 (for example, FIG. 6(a)). However, during the step pass-over control after Flow 203, the control is performed such that the gravity center position of the mobile device 1 falls within a range in front of the driving wheels 3a and 3b, that is, the second gravity center position range 32 (for example, FIG. 6(b)) including even an unstable range as the mobile device 1, and it is possible to further incline the upper body 8 forward than usual.

In Flow 204, the inclination angle command φref is changed to a forward inclination direction within the range where the gravity center position of the mobile device 1 falls within the second gravity center position range 32, and the process transitions to Flow 205.

In Flow 205, it is determined whether the driven wheel 5 is in a state floating from the ground in order to pass over the step or obstacle as a result of further inclining the upper body 8 forward as illustrated in FIG. 4(c). Whether the driven wheel 5 floats is determined based on the attitude angle θ in the pitch direction of the lower body 2 detected by the attitude angle detector 6. For example, when the attitude angle θ of the lower body 2 is larger than an attitude angle at the time when it is determined that the driven wheel 5 is caught by the step or obstacle (representing the forward inclination), it is determined that the driven wheel 5 is in the floating state and the process transitions to Flow 206. If there is no change, it is determined that the driven wheel 5 is not in the floating state, the process proceeds to Flow 204, and the inclination angle command φref is further increased.

In Flow 206, it is determined whether the traveling speed command vref>0 and the actual traveling speed v>0 are satisfied, that is, whether the driven wheel 5 has passed over the step, which is similar to Flow 202. If both of the inequalities are satisfied, it is determined that the vehicle has passed over the step and the process transitions to Flow 207. If any inequality is not satisfied, it is determined that the vehicle has not passed over the step, the process transitions to Flow 204, and the inclination angle command φref is further increased.

In Flow 207, switching is performed from the step pass-over control to normal travel control. That is, the gravity center position adjustment range is returned from the second gravity center position range 32 to the first gravity center position range 31, and the process transitions to Flow 208.

In Flow 208, the inclination angle command φref is returned to a normal inclination angle command such that the gravity center position of the mobile device 1 falls within the first gravity center position range 31, and the step detection control is continued in preparation for the next step as illustrated in FIG. 4(d).

As described above, the traveling control unit 102 detects the contact of the driving wheels 3a and 3b with the step or obstacle, and further detects whether the driven wheel 5 has passed over the step or obstacle. When detecting the catch, the first gravity center position range 31 of the mobile device 1 is changed to the second gravity center position range 32, the inclination angle command φref of the upper body 8 with respect to the lower body 2 is changed, and traveling is performed in the state where the driven wheel 5 floats from the ground so that it is possible to pass over the step or obstacle. After the pass-over, the gravity center position range and the inclination angle command φref are returned to the state before the detection of contact. Therefore, it is possible to prevent the mobile device from becoming immovable due to the step or obstacle by using a movement control means of the present embodiment.

Incidentally, the gravity center position adjustment is performed by rotating the upper body 8 relative to the lower body 2 to perform forward inclination or backward inclination in the present embodiment, but the same effect can be obtained even when the gravity center position adjustment is performed by movement in the forward or backward direction in the traveling direction. Further, the mobile device 1 having two driving wheels and one driven wheel has been described as an example in the above embodiment, but the number of these wheels is not limited.

Second Embodiment

Next, the mobile device 1 of a second embodiment will be described with reference to FIG. 7. Incidentally, common points with those of the mobile device 1 of the first embodiment will not be described.

A distance sensor 11 capable of measuring a distance between a traveling surface and the lower body 2 is installed between the driving wheels 3a and 3b and the driven wheel 5 in the lower body 2 of the mobile device 1 of the present embodiment. The distance sensor 11 is realized by an ultrasonic sensor, an optical sensor, or the like. A movement control flow according to the present embodiment is the same as that in FIG. 5, but the determination on passing over a step or obstacle in Flows 202 and 206 is different. Since the other flows are the same as those in the embodiment, the description thereof will be omitted.

In the present embodiment, an output of the distance sensor 11 is used to determine whether the driven wheel 5 has passed over the step or obstacle in Flow 202 of FIG. 5. When an output of the distance sensor 11 after a lapse of a presumable time when the driven wheel 5 comes into contact with the step or obstacle is the same as an output of the distance sensor 11 during normal traveling, it is determined that the driven wheel 5 has passed over the step, and the process ends. On the other hand, in the case of an output indicating that a distance is shorter than that of the output of the distance sensor during normal traveling, it is determined that there is the step or obstacle under the lower body 2, that is, the driven wheel 5 has been caught, and the process transitions to Flow 203. The output of the distance sensor 11 is also used in Flow 206 similarly to Flow 202.

As described above, whether the driven wheel 5 has passed over the step or obstacle is detected using the distance sensor 11 installed between the driving wheels 3a and 3b and the driven wheel 5 in the present embodiment, and thus, it is possible to more accurately detect the catch of the driven wheel 5 and to take a more appropriate measure as compared with the configuration of the first embodiment. Incidentally, the pass-over determination using only the distance sensor 11 has been exemplified in the present embodiment, but the distance sensor 11 may be used in combination with the means for pass-over determination described in the first embodiment.

Third Embodiment

Next, the mobile device 1 of a third embodiment will be described with reference to FIGS. 8 to 11. Incidentally, common points with those of the mobile device 1 of the above-described embodiments will not be described.

As illustrated in FIG. 8, an auxiliary wheel 12 that can be taken in and out is installed on a front surface of the lower body 2 of the mobile device 1 of the present embodiment. This auxiliary wheel 12 protrudes from the lower body 2 when the driven wheel 5 is caught on a step or an obstacle, and is provided with a drive mechanism that takes in and out the auxiliary wheel 12.

FIG. 9 illustrates each state when the mobile body 1 passes over a step or an obstacle, and FIG. 10 illustrates a control flow executed in the traveling control unit 102 when passing over a step.

Figure 9A:
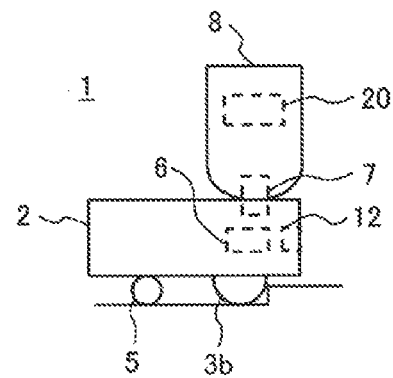
FIGS. 9A to 9D are each state views at the time of passing over a step according to the third embodiment.
Figure 9B:
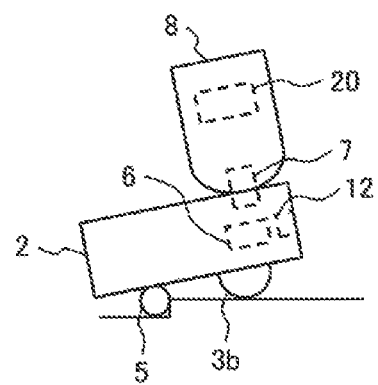

Flows 201 and 202 illustrated in FIG. 10 are the same as those in the first embodiment. Therefore, the states of the mobile device 1 illustrated in FIGS. 9(a) and 9(b) are also the same as the states illustrated in FIGS. 4(a) and 4(b).

When it is determined in Flow 202 that the driven wheel 5 has been caught by the step, the process transitions to Flow 210. In Flow 210, the auxiliary wheel 12 protrudes from the lower body 2, and the process transitions to Flow 211.

Figure 9C:
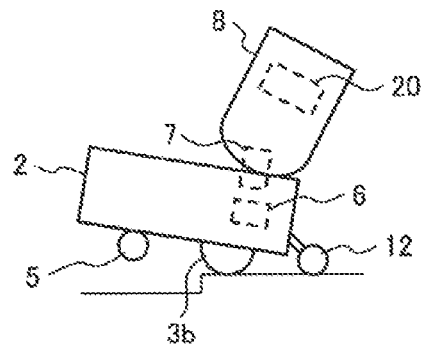

In Flow 211, the gravity center position adjustment range is changed from the first gravity center position range to a third gravity center position range 33, and the process transitions to Flow 212. As illustrated in FIG. 11, the third gravity center position range 33 is a rectangular range surrounded by ground points of the driving wheels 3a and 3b and the auxiliary wheel 12, and the mobile device 1 in a state where the auxiliary wheel 12 is grounded can stably travel when the center of gravity is within this range. In Flow 212, the inclination angle command φref of the upper body 8 with respect to the lower body 2 is changed such that a gravity center position of the mobile device 1 is within the third gravity center position range 33, and the process transitions to Flow 213. In Flow 213, the upper body 8 is inclined forward, and the auxiliary wheel 12 is grounded to a traveling surface as illustrated in FIG. 9(c). Since positions of the driving wheels 3a and 3b and a position of the auxiliary wheel 12 are known, the determination on grounding can be made based on an inclination angle θ of the lower body 2 in the pitch direction detected by the attitude angle detector 6. When it is determined that the vehicle has been grounded, the driving wheels 3a and 3b are driven by a predetermined amount, and the process transitions to Flow 206.

The step pass-over determination of the driven wheel 5 in Flow 206 is the same as that in the first embodiment, and the process transitions to Flow 215 if the driven wheel 5 has passed over or transitions to Flow 214 if the driven wheel 5 has not passed over.

When the driven wheel 5 has not passed over the step, the position of the auxiliary wheel 12 is changed to the upper body 8 side, that is, the auxiliary wheel 12 is moved to a position where the driven wheel 5 floats higher in Flow 214, and then, the process transitions to Flow 216. In Flow 216, the gravity center position adjustment range is changed to a new third gravity center position range 33 defined by the auxiliary wheel 12 after the movement, and the process transitions to Flow 217. In Flow 217, the inclination angle command φref is changed such that the gravity center position of the mobile device 1 exists within the third gravity center position range 33, the upper body 8 is inclined more forward, and then, the process transitions to Flow 206.

Figure 9D:
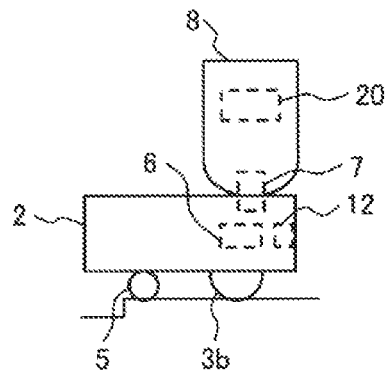

On the other hand, when the driven wheel 5 has passed over the step, the auxiliary wheel 12 is stored as illustrated in FIG. 9(d) in Flow 215, and then, Flows 207 and 208 are executed, and the determination in Flow 201 is repeated in preparation for the next step similarly to the first embodiment.

As described above, according to the mobile device 1 of the present embodiment, it is possible to more stably pass over the step by using the auxiliary wheel 12 attached to the lower body 2 in addition to the same effects as those in the first embodiment.

Incidentally, the auxiliary wheel 12 is configured to be stored usually in the present embodiment, but may protrude beforehand as long as the auxiliary wheel 12 can be controlled so as to be movable in the vertical direction. Further, it is confirmed that the auxiliary wheel 12 is grounded on the traveling surface, but the same effect can be obtained even when determination is made through the traveling before confirming the grounding, similarly to the first embodiment.

Further, the auxiliary wheel 12 has been used, but any one such as a support rod made of a material having a slippery distal end may be used.

Fourth Embodiment

Next, a mobile device management system according to a fourth embodiment will be described with reference to FIG. 12. This mobile device management system includes mobile devices 1A and 1B and a management device 120 configured to manage the mobile devices 1A and 1B. Incidentally, the mobile device 1A and the like are equivalent to the mobile device 1 of the above-described embodiments except that an antenna for communication with the management device 120 and a memory storing received data are provided, and thus, duplicate descriptions thereof will be omitted.

As illustrated in FIG. 12, the management device 120 includes a control device 120a such as a CPU, a storage medium 120b such as an HDD, an interface 120c for an external device, and an antenna 120d configured to perform wireless communication. In the storage medium 120b, map data 120b1 regarding a shape or topography of an area where the mobile devices 1A and 1B travel is recorded. This map data 120b1 contains step position information on a position of a step which is present in the area and can be passed over by the mobile device 1 and obstacle position information on a position of an obstacle which is difficult for mobile device 1 to pass over in addition to information on the area shape and the like.

The mobile devices 1A and 1B take in the map data 120b1 possessed by the management device 120 via wireless communication, and can perform autonomous traveling or remote control traveling with reference to the map data 120b1. That is, when it is possible to grasp a step on a traveling-scheduled route in advance, it is possible to pass over the step with shorter time by starting the step pass-over control according to any one of the first to third embodiments before reaching the step. Further, when it is possible to grasp an obstacle on the traveling-scheduled route in advance, the route can be switched to a traveling route avoiding the obstacle.

Further, when the mobile devices 1A and 1B detect a new step or obstacle on the area, step position information or obstacle position information related thereto may be transmitted to the management device 120 to update the map data 120b1. As a result, a traveling route of the mobile device 1B can be determined, for example, in consideration of the new step or obstacle which has been discovered by the mobile device 1A and reflected in the map data 120b1, and thus, it is possible to improve the traveling efficiency of the mobile device management system as a whole.

Incidentally, the mobile device management system that manages the two mobile devices 1A and 1B has been described here as an example, but the number of mobile devices 1 to be managed may be one or three or more. When there is only one mobile device 1 to be managed, it may be configured such that the configuration of the management device 120 is incorporated in the mobile device 1, that is, the map data 120b1 is recorded in the storage medium 120b inside the mobile device 1.

Incidentally, the present invention is not limited to the above-described embodiments and includes various modifications. For example, the above-described embodiments have been described in detail in order to describe the present invention in an easily understandable manner, and are not necessarily limited to one including the entire configuration that has been described above. Further, some configurations of a certain embodiment can be substituted by configurations of another embodiment, and further, a configuration of another embodiment can be also added to a configuration of a certain embodiment. Further, addition, deletion, or substitution of other configurations can be made with respect to the configurations of each embodiment.

Further, only control lines and information wars considered to be necessary for the description have been illustrated, and all of the control lines and information lines required as a product are not necessarily illustrated. It may be considered that most of configurations are practically connected to each other.

REFERENCE SIGNS LIST 1, 1A, 1B mobile device
2 lower body
3a, 3b driving wheel
4a, 4b wheel drive mechanism
5 driven wheel
6 attitude angle detector
7 gravity center position adjustment mechanism
8 upper body
11 distance sensor
12 auxiliary wheel
20 electronic arithmetic processor
31 first gravity center position range
32 second gravity center position range
33 third gravity center position range
100 traveling control system
101 traveling route calculation unit
102 traveling control unit
103a, 103b driving wheel control unit
103c upper body attitude control unit
104a, 104b, 104c drive motor
105a, 105b, 105c position sensor
120 management device
120a control device
120b storage medium
120b1 map data
120c interface
120d antenna

The invention claimed is:

1. A mobile device comprising:
a lower body;
an upper body provided in an upper portion of the lower body;
a gravity center position adjustment means for changing an angle or a position of the upper body with respect to the lower body;
a driving wheel and a driven wheel provided in a lower portion of the lower body; and
an auxiliary wheel installed on a front surface of the lower body and movable in a vertical direction in front of the lower body,
wherein, during movement in a direction in which the driving wheel is on a front side and the driven wheel is on a rear side,
the gravity center position adjustment means inclines or moves the upper body to the front side when the driven wheel passes over a step,
moves the upper body toward an original angle or position after the driven wheel passes over the step, and
wherein the auxiliary wheel is not grounded before and after the driven wheel passes over the step, and the auxiliary wheel is grounded when the driven wheel passes over the step.

2. The mobile device according to claim 1, wherein
the gravity center position adjustment means controls the angle or the position of the upper body within a range in which a center of gravity falls within a first gravity center position range which enables stable traveling before and after the driven wheel passes over a step, and
controls the angle or the position of the upper body within a range in which the center of gravity falls within a second gravity center position range that extends to the front side from the first gravity center position range when the driven wheel passes over the step.

3. The mobile device according to claim 2, wherein
the driven wheel floats when the driven wheel passes over the step, and
the driven wheel is grounded after the driven wheel passes over the step.

4. The mobile device according to claim 2, further comprising
an impact detection means for detecting an impact received by the driving wheel, a step detection means for detecting a step in a travel direction of the driven wheel, or a map data storage means for storing map data in which a step position is recorded,
wherein the gravity center position adjustment means inclines or moves the upper body to the front side after the impact detection means detects the impact, after the step detection means detects the step, or before reaching the step position recorded in the map data.

5. The mobile device according to claim 4, wherein
the impact detection means detects an impact when any of a difference between a traveling speed command and an actual traveling speed, a difference between a current command of a driving means for driving the driving wheel and an actual current, and an inclination angle of the lower body exceeds a predetermined threshold.

6. The mobile device according to claim 1, wherein the auxiliary wheel protrudes from the lower body when the driven wheel is caught on the step.

7. A transport device management system comprising:
a management device having map data in which a step position is recorded; and
mobile devices moving based on the map data received from the management device,
wherein the mobile device includes: a lower body; an upper body provided in an upper portion of the lower body; a gravity center position adjustment means for changing an angle or a position of the upper body with respect to the lower body; a driving wheel and a driven wheel provided in a lower portion of the lower body; an auxiliary wheel installed on a front surface of the lower body and movable in a vertical direction in front of the lower body; and an antenna used for communication with the management device, and during movement in a direction in which the driving wheel is on a front side and the driven wheel is on a rear side, the gravity center position adjustment means inclines or moves the upper body to the front side when the driven wheel passes over a step, and moves the upper body toward an original angle or position after the driven wheel passes over the step; wherein the auxiliary wheel is not grounded before and after the driven wheel passes over the step, and the auxiliary wheel is grounded when the driven wheel passes over the step.

8. The mobile device management system according to claim 7, wherein the mobile devices are a first mobile device and a second mobile device, in the map data, step position information on a position of a step detected by the first mobile device is recorded, and the second mobile device refers to the map data to determine a traveling route.

9. The mobile device management system according to claim 7, wherein the auxiliary wheel protrudes from the lower body when the driven wheel is caught on the step.

* * * * *